J. REGAN.

WARP-STOP MOTION.

APPLICATION FILED OCT. 26, 1918.

Reissued Mar. 30, 1920.

14,829.

2 SHEETS—SHEET 1.

Inventor
John Regan
Southgate & Southgate
Attorneys

J. REGAN.

WARP STOP MOTION.

APPLICATION FILED OCT. 26, 1918.

Reissued Mar. 30, 1920.

14,829.

2 SHEETS—SHEET 2.

Inventor
John Regan

Southgate & Southgate
Attorneys

UNITED STATES PATENT OFFICE.

JOHN REGAN, OF NEW BEDFORD, MASSACHUSETTS, ASSIGNOR TO CROMPTON & KNOWLES LOOM WORKS, OF WORCESTER, MASSACHUSETTS, A CORPORATION OF MASSACHUSETTS.

WARP STOP-MOTION.

14,829. Specification of Reissued Letters Patent. Reissued Mar. 30, 1920.

Original No. 1,265,112, dated May 7, 1918, Serial No. 160,276, filed April 6, 1917. Application for reissue filed October 26, 1918. Serial No. 259,876.

*To all whom it may concern:*

Be it known that I, JOHN REGAN, a citizen of the United States, residing at New Bedford, in the county of Bristol and State of Massachusetts, have invented a new and useful Warp Stop-Motion, of which the following is a specification.

This invention relates to a warp stop motion of the type in which a fallen drop wire renders certain mechanical devices effective to stop the loom.

Warp stop motions of this general type are in very common use and as usually built comprise a vibrator bar having an oscillating movement beneath the drop wires. The vibrator is mounted to swing as close as possible to a second bar fixed to the frame of the stop motion. When a drop wire is released by the breaking of a warp thread it falls between the vibrator bar and the second or fixed bar, and thus prevents movement of the vibrator bar past and beneath the fixed bar. Such interference with the free movement of the vibrator bar causes the stopping of the loom. For coarse work the results are reasonably satisfactory, but on very fine work for which the drop wires are necessarily made of extremely thin stock it is found that a stop motion of this type must be made with extreme accuracy in order to be reliable. Unless the vibrator bar swings as close as possible beneath the fixed bar, the very thin and flexible drop wires will bend and slip between the vibrator and the fixed bar without stopping the loom.

It is the general object of my invention to avoid such necessity for extreme accuracy by providing a warp stop motion in which the loom stopping mechanism is rendered effective by the direct coöperation of a fallen drop wire with a detector preferably extending through an opening in each drop wire.

In the preferred form of my invention the opening in the drop wire is formed with wide and narrow portions, and the detector is in the form of a rod of non-circular cross section extending through the openings in the drop wires and normally oscillating freely therein. Upon the falling of a drop wire the narrow upper portion of the opening in the fallen wire engages the detector rod while another portion of the drop wire engages a fixed member and oscillation of said rod is thereby prevented. This construction is found to be extremely reliable in operation and does not require any special accuracy in the making of the parts of the stop motion.

Other important features of my invention relate to the provision of a single rod or bar only extending through the openings in the drop wires, whereby said rod is accessible from all sides throughout its entire length.

My invention further relates to certain arrangements and combinations of parts which will be hereinafter described and more particularly pointed out in the appended claims.

A preferred form of my invention is shown in the drawings, in which

Figure 1:
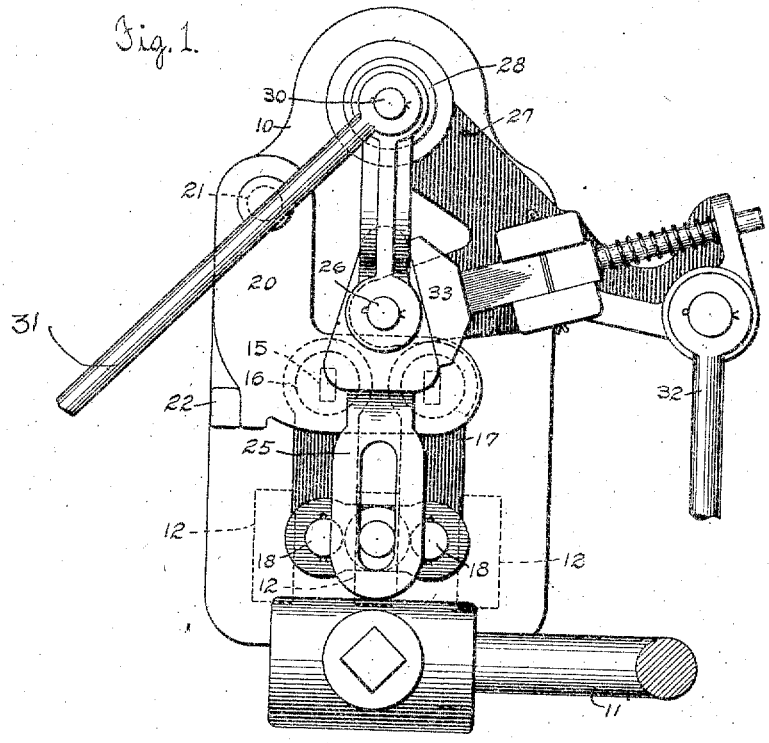
Figure 1 is an end elevation of my improved stop motion.
Figure 2:
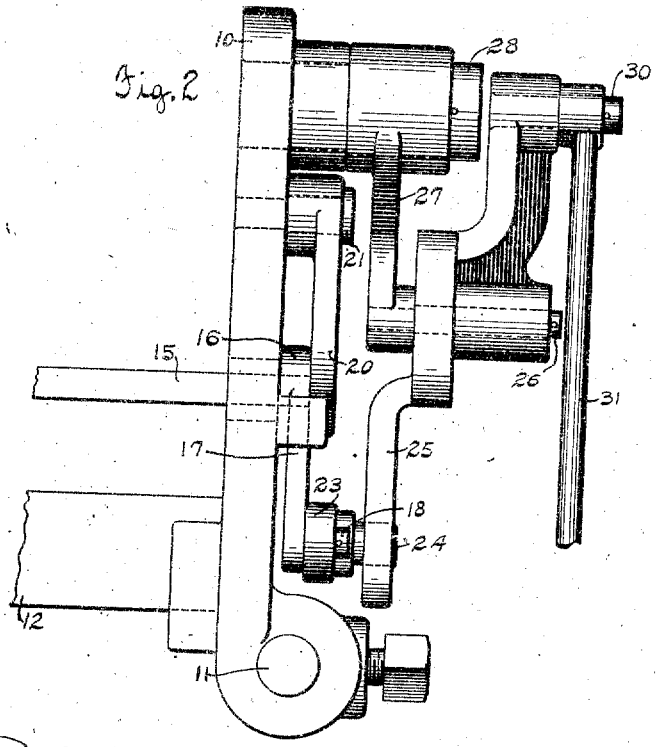
Fig. 2 is a partial front elevation of the parts shown in Fig. 1.

In Figs. 1 and 2 I have shown the operative end of a warp stop motion, including the mechanism for angularly moving the detector rods. The detecting mechanism is mounted upon a frame 10 adjustably secured to a rod 11 fixed to the loom side (not shown). The frame 10 is connected by bars 12 to a similar frame at the opposite side of the loom. The bars 12 are separated sufficiently to permit the drop wires 13 to swing freely between them, the stop motion shown in the drawings being arranged with two sets or banks of wires 13 and requiring three bars 12.

The wires 13 may be of different well-known styles in accordance with the particular class of goods upon which they are to be used, the wire shown in the drawing being slotted at its lower end and being provided with an opening 14 in its upper end formed with a wide portion $14^a$ and a narrow portion $14^b$.

Each bank of wires 13 coöperates with a detecting rod 15 which extends through the wide portion 14[a] of the drop wires when they are in normal position. The rod 15 is of non-circular cross section and each end of the rod is preferably supported in a circular bearing block 16. The block 16 at the operative end of the stop motion shown in Figs. 1 and 2 is provided with a downwardly extending arm 17 having a stud or projection 18 at its lower end.

The bearing blocks 16 are secured in position by a plate 20 (Fig. 1) pivoted at 21 to the frame 10 and being normally positioned by a stop 22 so that the lower portion of the plate 20 covers the bearing blocks 16, retaining them in the frame 10 and preventing the longitudinal removal or displacement of the rods 15. When it is desired to remove either of the detecting rods the plate 20 is swung upward and to the right in Fig. 1 to uncover the ends of the rods.

A link 23 is mounted on the studs 18 at the lower ends of the arms 17, said link being itself provided with a stud 24 extending outwardly into position to engage a slotted lever 25. The lever 25 is pivoted on a stud 26 carried by an arm 27 which in turn swings on a pivot 28 fixed to the frame 10. The lever 25 extends upwardly beyond the stud 26 and at its upper end is provided with a stud 30 upon which is pivoted one end of a link 31 through which the knock-off mechanism is controlled.

The arm 27 is regularly oscillated through an actuating link 32 by which the arm is connected to actuating mechanism not shown. The arm 27 also supports a spring plunger 33 engaging the lever 25 and by which the lever is retained yieldingly in the position shown in Fig. 1. For a complete description of the actuating mechanism, reference is made to the patent to Wyman, No. 665,713, issued January 8, 1901.

Figure 3:
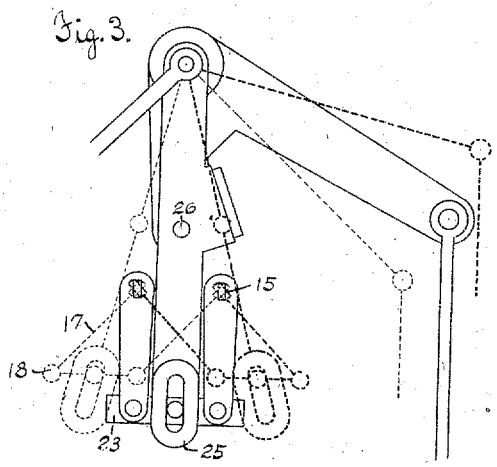
Figs. 3 and 4 are diagrammatic end elevations showing the operation of the parts under different conditions.
Figure 5:
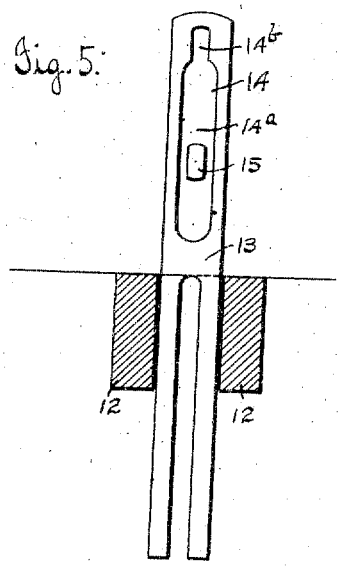
Fig. 5 shows the relative position of the drop wire and detector under normal conditions.

Under normal conditions the slotted lever 25 moves in unison with the arm 27 about the pivot 28 as a center, swinging the link 23, the studs 18 and arms 17 to the right and left to the dotted line positions shown in Fig. 3, and thereby oscillating the detector rods 15 about the axes of the circular bearing blocks 16. This free oscillation of the detector rods will continue so long as the drop wires are all in the raised position shown in Fig. 5.

Figure 4:
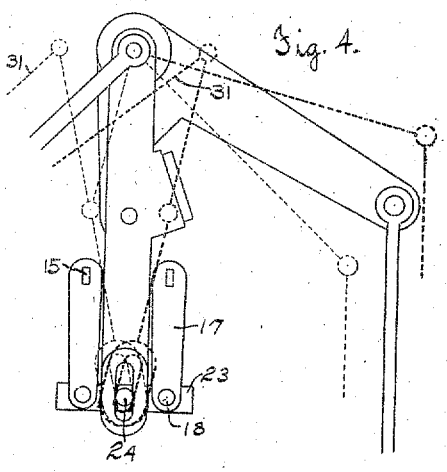
Figure 6:
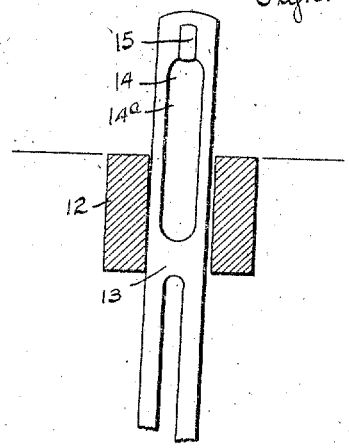
Fig. 6 shows the relative position which the drop wire and detector assume upon the breaking of a warp thread.

When one of the warp threads breaks the corresponding drop wire falls to the position shown in Fig. 6, engaging the detector rod between the sides of the narrow portion 14[b] of the opening 14. Simultaneous engagement of the wire with a fixed bar 12 renders normal oscillation of the rod impossible and accordingly the arms 17, the studs 18 and link 23 are held in the position shown in Fig. 4, thus causing the stud 24 on the link 23 to act thereafter as a fixed pivot for the slotted lever 25, which thereafter swings about the pivot 24 and moves the link 31 to the right or left to one of the dotted line positions shown in Fig. 4. Such movement of this link in either direction places the knock-off mechanism in operation to stop the loom.

While the angular movement of the detector is herein shown as an oscillatory movement, my invention is not limited to any particular form of movement, as a continuous or intermittent movement in a single direction is equally adapted to the purposes herein described.

Having thus described my invention the simplicity and advantages thereof will be apparent. It will be particularly noted that the loom is stopped by direct coöperation of the fallen drop wire with the detector rod, and with a fixed member as 12, and that it is not dependent in any way upon the relative position or adjustment of other parts. It will be also noted that the cross section of the rod 15 may be varied as desired provided only that a non-circular cross section be used.

The engagement of the fallen drop wire with the detector rod occurs at two separated points, preferably at opposite sides of the axis of said detector, and when thus engaged, movement of the drop wire by the detector is prevented by engagement of the fallen drop wire with some adjacent fixed member, as the guide bar 12. The utility and value of my invention reside to a considerable extent in this three point engagement of the drop wire.

It should be noted that the location of the opening 14 above the warp threads, while advantageous, is not essential. With certain classes of goods the opening 14 and detector rod 15 will preferably be at the upper end of the drop wires and above the warp, as shown in the drawings, while with different classes of goods it may be found desirable to position the detector rods below the warp threads.

It will be also evident that other changes and modifications can be made in my improved stop motion without departing from the spirit and scope of my invention as set forth in the claims, and I do not wish to be otherwise limited to the details herein disclosed, but what I do claim is:—

1. A warp stop motion having, in combination, a plurality of drop wires each having an opening therein, a detector extending through said openings and normally freely movable therein, means to give said detector operative oscillatory movements in two directions, and means to stop the loom when the movement of said detector in either direction is prevented, each drop wire when unsupported by a warp thread being effective to prevent movement of said detector.

2. A warp stop motion comprising a plurality of drop wires each having an opening therein formed with wide and narrow portions, a detector of non-circular cross section extending through said openings at the wide portion when the drop wires are in normal position, said detector being freely movable in said wide portion of said openings, but being held from movement when in the narrow portion of the opening in a fallen drop wire by engagement with the two opposed sides of the opening at said narrow portion, means to move said detector, and means to stop the loom when the movement of said detector is prevented.

3. A warp stop motion comprising a plurality of drop wires each having an opening therein with a wide lower portion and a narrow upper portion, a single rod of non-circular cross section extending freely through said wide lower portion of said openings when the wires are in normal position, means to oscillate said rod, said rod being free to oscillate when in said wide portion but being held by the drop wire from movement in either direction when in the narrow portion of the opening in a fallen drop wire, and means to stop the loom when said rod is held from oscillation.

4. A warp stop motion comprising a detector rod of non-circular cross section, circular bearing blocks supporting the ends of said rod, bearings for said blocks, means connected to one of said blocks to oscillate said blocks and rod, and a movable device effective to normally prevent longitudinal removal of said rod from said blocks, but permitting such removal when said device is moved from normal position.

5. A warp stop motion comprising drop wires arranged in a plurality of sets, each drop wire having an irregular opening therein, a detector rod of non-circular cross section extending through the openings in each set of drop wires, circular bearing blocks for each detector rod, bearings for said blocks, arms connected to said blocks, a link connecting said arms, and actuating mechanism for moving said link, said rods and link being held from movement by a fallen drop wire coöperating with a fixed member and said actuating mechanism being thereby rendered effective to stop the loom.

6. A warp stop motion for a loom comprising a plurality of drop wires mounted independently of the loom harnesses, a detector, a member fixed adjacent a fallen drop wire, means to give said detector a yielding detecting movement about an axis thereof, and means to stop the loom when normal movement of said detector is prevented, said detector being freely movable about said axis when all of said drop wires are in normal position, and being held from movement by engagement by a fallen drop wire at two points diametrically separated in respect to said axis while said drop wire engages said fixed member at a third point.

7. A warp stop motion comprising a plurality of drop wires, a fixed member, a detector, means to give said detector a detecting movement about an axis thereof, and means to stop the loom when normal angular movement of said detector is prevented, said detector being freely movable about said axis when all of said drop wires are in normal position, and being held from normal angular movement by engagement by a fallen drop wire at two points oppositely disposed in respect to said axis, while said drop wire simultaneously engages said fixed member at a third point.

8. A warp stop motion comprising a plurality of drop wires, a single detector, means to give said detector a detecting movement, a fixed member positioned adjacent a fallen drop wire, and means to stop the loom when the detector is held from normal movement, said drop wires being each provided with an opening having a portion within which said detector is freely movable when said drop wires are in normal position, and having another portion with edges adapted to engage said detector at two separated points after the drop wire falls, said fallen drop wire at the same time engaging said fixed member and through such joint engagement preventing normal movement of said detector.

9. A warp stop motion comprising a plurality of drop wires each having an opening therein with a wide lower portion and a narrow upper portion, a single detector extending freely through said wide lower portion of said opening when the wires are in normal position, a fixed member positioned adjacent a fallen drop wire but spaced from said detector, means to give said detector a yielding detecting movement, and means to stop the loom when normal movement of said detector is prevented, said detector being free to move when in the wide lower portion of the drop wire openings, but being held from movement when in the narrow upper portion of the opening in a fallen drop wire, and said fixed member being effective to restrain movement of said fallen drop wire and said detector when said drop wire engages said detector.

10. A warp stop motion comprising a bank of drop wires each having an opening therein with a wide lower portion and a narrow upper portion, a single detector rod only of non-circular cross section extending freely and alone through said wide lower portion of the openings in said bank of wires when the wires are in normal position, means to give said rod a detecting movement, said rod being free to move when in the wide lower portions of said openings but being engaged by the drop wire when in the narrow upper portion of the opening in a fallen drop wire and being held thereby from normal movement relative to said wire, means to restrain movement of said drop wire by said detector when thus engaged, and means to stop the loom when said rod is held from normal movement.

In testimony whereof I have hereunto affixed my signature.

JOHN REGAN.